United States Patent
Hijikata

(10) Patent No.: US 6,510,385 B2
(45) Date of Patent: Jan. 21, 2003

(54) NAVIGATION APPARATUS, NAVIGATION METHOD, AND INFORMATION RECORDING MEDIUM IN WHICH PROGRAM FOR NAVIGATION IS COMPUTER-READABLY RECORDED

(75) Inventor: Makoto Hijikata, Kawagoe (JP)

(73) Assignee: Pioneer Corporation, Tokyo-to (JP)

( * ) Notice: Subject to any disclaimer, the term of this patent is extended or adjusted under 35 U.S.C. 154(b) by 0 days.

(21) Appl. No.: 10/012,457

(22) Filed: Dec. 12, 2001

(65) Prior Publication Data

US 2002/0077747 A1 Jun. 20, 2002

(30) Foreign Application Priority Data

Dec. 14, 2000 (JP) ........................................ 2000-379907

(51) Int. Cl.⁷ ................................................ G01C 21/30
(52) U.S. Cl. ....................... 701/209; 701/202; 701/205; 701/210; 701/224; 701/6
(58) Field of Search ................................. 701/200, 202, 701/205, 209, 210, 224, 26

(56) References Cited

U.S. PATENT DOCUMENTS 5,434,788 A 7/1995 Seymour et al. ............ 364/449

FOREIGN PATENT DOCUMENTS

EP 0 782 118 A1 7/1997

*Primary Examiner*—Yonel Beaulieu
(74) *Attorney, Agent, or Firm*—Nixon & Vanderhye P.C.

(57) ABSTRACT

A navigation apparatus which can improve convenience of navigation by starting assisting of the movement without delay by inferring a predetermined route. This navigation apparatus includes a system controlling unit for setting a predetermined route which a vehicle travels, for inferring whether or not the vehicle deviates from a predetermined route and continues during travel of the vehicle along a predetermined route, when it is inferred that the vehicle deviates from the predetermined route, which then begins to set an inferred predetermined route where the vehicle should travel after deviating from the predetermined route.

12 Claims, 4 Drawing Sheets

MP : MAP INFORMATION

🚩 : SCHOOL

Ⓢ : SERVICE CENTRE

Ⓔ : OIL OR NATURAL GAS FACILITY

NAVIGATION APPARATUS, NAVIGATION METHOD, AND INFORMATION RECORDING MEDIUM IN WHICH PROGRAM FOR NAVIGATION IS COMPUTER-READABLY RECORDED

BACKGROUND OF THE INVENTION

1. Field of the Invention

The present invention relates to a technical field regarding a navigation apparatus, a navigation method, and an information recording medium in which a program for navigating is recorded so as to be readable through a computer. More particularly, the present invention relates to a technical field regarding a navigation apparatus and a navigation method, which are used so as to assist the movement of a mobile unit under the condition of being set the predetermined route where the mobile unit should move in advance, and an information recording medium in which a navigating program for assisting the movement of a mobile unit is recorded so as to be readable through a computer.

2. Description of the Related Art

In recent years, the spread of a navigation apparatus for a mobile unit such as a vehicle is outstanding. In such a navigation apparatus, it is commonly performed, for instance, before departure, to set in advance the predetermined route which is obtained by being regarded the destination which should be reached hereafter as an endpoint, and to assist the movement of the mobile unit in compliance with the predetermined route.

During performing the assistance of the movement in compliance with the predetermined route, provided that the vehicle deviates from the predetermined route for a certain reason and continues traveling, after the deviation is certainly done, the navigation apparatus starts setting a new predetermined route where the vehicle should travel.

However, in accordance with the aforementioned former way of setting a new predetermined route, the action of setting the new route essentially requires a certain amount of time (from several seconds to ten seconds or so). Therefore, just after the deviation from the previous predetermined route happens, it is impossible to assist the movement in compliance with the predetermined route which is newly set. As a result, there is a problem that the convenience of the navigation apparatus degrades.

SUMMARY OF THE INVENTION

The present invention is made in consideration of the aforementioned problems. It is an object of the present invention to provide a navigation apparatus and a navigation method, which can start assisting of the movement without delay by inferring the predetermined route, and which can improve its convenience as a navigation apparatus, and an information recording medium in which a navigating program for assisting the movement of the mobile unit is recorded so as to be readable through a computer.

The above object of the present invention can be achieved by a navigation apparatus provided with: a predetermined route setting device such as system controlling unit etc., for setting a predetermined route which a mobile unit travels; an inferring device such as system controlling unit etc., for inferring whether or not the mobile unit deviates from the predetermined route during traveling of the mobile unit along the predetermined route; and a setting start device such as system controlling unit etc., for, when it is inferred that the mobile unit deviates from the predetermined route, starting to set the inferred predetermined route where the mobile unit travels after deviating from the predetermined route.

Accordingly, when it is inferred that a mobile unit deviates from the predetermined route, and then the navigation apparatus starts setting the inferred predetermined route before it actually deviates from the predetermined route. So after the mobile unit deviates from the predetermined route as it was inferred, it is possible to start assisting the movement of the mobile unit without delay in compliance with the inferred predetermined route which should be a predetermined route thereafter.

Therefore, by starting to assist the movement in compliance with the inferred predetermined route without delay, it is possible to improve its convenience as a navigation apparatus.

In one aspect of the navigation apparatus of the present invention, the inferring device provided with: a behaviors detecting device such as system controlling unit etc., for detecting behaviors which the mobile unit is inferred to do during traveling; a present position detecting device such as system controlling unit etc., for detecting the present position of the mobile unit; and a decision device such as system controlling unit etc., for, on the basis of the detected behaviors and the detected present position, deciding whether or not the mobile unit deviates from the predeterminating route.

Accordingly, whether or not the mobile unit deviates from the predetermined route is determined on the basis of both the inferred behaviors which are detected and the present point which is detected. It is possible to infer the deviation of the mobile unit with more reliability and more accuracy, and to start setting the inferred predetermined route. As a result, it is possible to complete the action of setting the inferred predetermined route with less time.

In another aspect of the navigation apparatus of the present invention, the mobile unit is a vehicle; and the behaviors detecting device provided with: a direction indicators' action detecting device such as system controlling unit etc., for detecting which side of the direction indicators is in action; and when the action of the direction indicators is confirmed, the behaviors detecting device starts detecting behaviors of the mobile unit.

Accordingly, since the navigation apparatus makes sure the beginning of the action of the traffic indicator, and since it starts detecting the action of inferring the behaviors of the vehicle, it is possible to start detecting the inferring behaviors with reliability.

In further aspect of the navigation apparatus of the present invention, the mobile unit is a vehicle; and the behaviors detecting device provided with: a direction indicators' action detecting device such as system controlling unit etc., for detecting which side of the direction indicators is in action; and a judging device such as system controlling unit etc., for, on the basis of the detected behaviors of the direction indicators, judging that the mobile unit turns to the direction which the in-action direction indicators indicate.

Accordingly, it is detected which side of the traffic indicators blinks, and it is judged that the vehicle will make a turn towards the direction which the traffic indicator on duty blinks on the basis of the action of the traffic indicator which is detected. It is possible to detect the inferred behaviors (either right-hand turn or left-hand turn) of the mobile unit with more accuracy.

In further aspect of the navigation apparatus of the present invention, the mobile unit is a vehicle; the present position detecting device detects which traffic lane of the road the mobile unit is traveling on; and when it is detected that the mobile unit is traveling on the outer lane on the road and that it is slowing down in the position where the mobile unit must travel straight in the predetermined route, the decision device infers that the mobile unit deviates from the predetermined route, and that the mobile unit turns to the direction of the traffic lane where the mobile unit is traveling from the view of the center line of the road.

Accordingly, since it is inferred which direction of right-hand turn or left-hand turn that the mobile unit will make on the basis of a traffic lane which the vehicle is traveling on and its present speed, it is possible to detect the inferred behaviors of the mobile unit even before the traffic indicator blinks, and to start setting the inferred setting route.

The above object of the present invention can be achieved by a navigation method provided with: a predetermined route setting process for setting a predetermined route which a mobile unit travels; an inferring process for inferring whether or not the mobile unit deviates from the predetermined route during traveling of the mobile unit along the predetermined route; and a setting start process for, when it is inferred that the mobile unit deviates from the predetermined route, starting to set the inferred predetermined route where the mobile unit travels after deviating from the predetermined route.

Accordingly, when it is inferred that the mobile unit deviates from the predetermined route, since it starts setting the inferred predetermined route before the mobile unit actually deviates, after the mobile unit deviates from the predetermined route as it was inferred, it is possible to start assisting the movement of aforementioned mobile unit without delay in compliance with the inferred predetermined route which is a predetermined route thereafter.

Therefore, by starting to assist the movement in compliance with the inferred predetermined route without delay, it is possible to improve its convenience as a navigation apparatus.

In one aspect of the navigation method of the present invention, the inferring process provided with: a behaviors detecting process for detecting behaviors which the mobile unit is inferred to do during traveling; a present position detecting process for detecting the present position of the mobile unit; and a decision process for, on the basis of the detected behaviors and the detected present position, deciding whether or not the mobile unit deviates from the pre-determinating route and continues traveling.

Accordingly, whether or not the mobile unit deviates from the predetermined route is decided on the basis of both the inferred behaviors which are detected and the present point which is detected. It is possible to infer the deviation of the mobile unit with more reliability and more accuracy, and to start setting the inferred predetermined route. As a result, it is possible to complete the action of setting the inferred predetermined route with less time.

The above object of the present invention can be achieved by an information recording medium in which a navigating program is recorded so as to be readable through a computer which functions as a navigation apparatus, the navigating program being characterized by allowing the computer to function as: a predetermined route setting device for setting a predetermined route which a mobile unit travels; an inferring device for inferring whether or not the mobile unit deviates from the predetermined route during the mobile unit's traveling along the predetermined route; and a setting start device for, when it is inferred that the mobile unit deviates from the predetermined route, starting to set the inferred predetermined route where the mobile unit travels after deviating from the predetermined route.

Accordingly, when it is inferred that the mobile unit deviates from the predetermined route, since the computer functions so as to make the action of setting the inferred predetermined route start before it deviates from the predetermined route actually, after the mobile unit deviates from the predetermined route as it was inferred, it is possible to start assisting the movement of the aforementioned mobile unit without delay in compliance with the inferred predetermined route which is a predetermined route thereafter.

Therefore, by starting to assist the movement in compliance with the inferred predetermined route without delay, it is possible to improve its convenience as a navigation apparatus.

In one aspect of the information recording medium of the present invention, the navigating program is recorded so as to be readable through the computer which functions as the inferring device, the navigating program being characterized by allowing the computer to function as: a behaviors detecting device for detecting behaviors which the mobile unit is inferred to do during traveling; a present position detecting device for detecting the present position of the mobile unit; and a decision device for, on the basis of the detected behaviors and the detected present position, deciding whether or not the mobile unit deviates from the predeterminating route.

Accordingly, since the computer functions so as to decide whether or not the mobile unit deviates from the predetermined route on the basis of both the inferred behaviors which is detected and the present point which is detected, it is possible to infer the deviation of the mobile unit with more reliability and more accuracy, and to start setting the inferred predetermined route. As a result, it is possible to complete the action of setting the inferred predetermined route with less time.

DETAILED DESCRIPTION OF THE PREFERRED EMBODIMENTS

A preferred embodiment of the present invention will now be described with reference to the drawings.

The present embodiment described hereinafter relates to a navigation apparatus for vehicles (in this specification, referred to 'a navigation apparatus') which the present invention is applied to. The navigation apparatus can assist the vehicle to travel by displaying the map which contains the predetermined traveling route that is in advance set to go to (referred to 'setting route').

First, the whole configuration and the outline of the operation of the navigation apparatus according to an embodiment will now be described with reference to FIG. 1 and FIG. 2.

Figure 1:
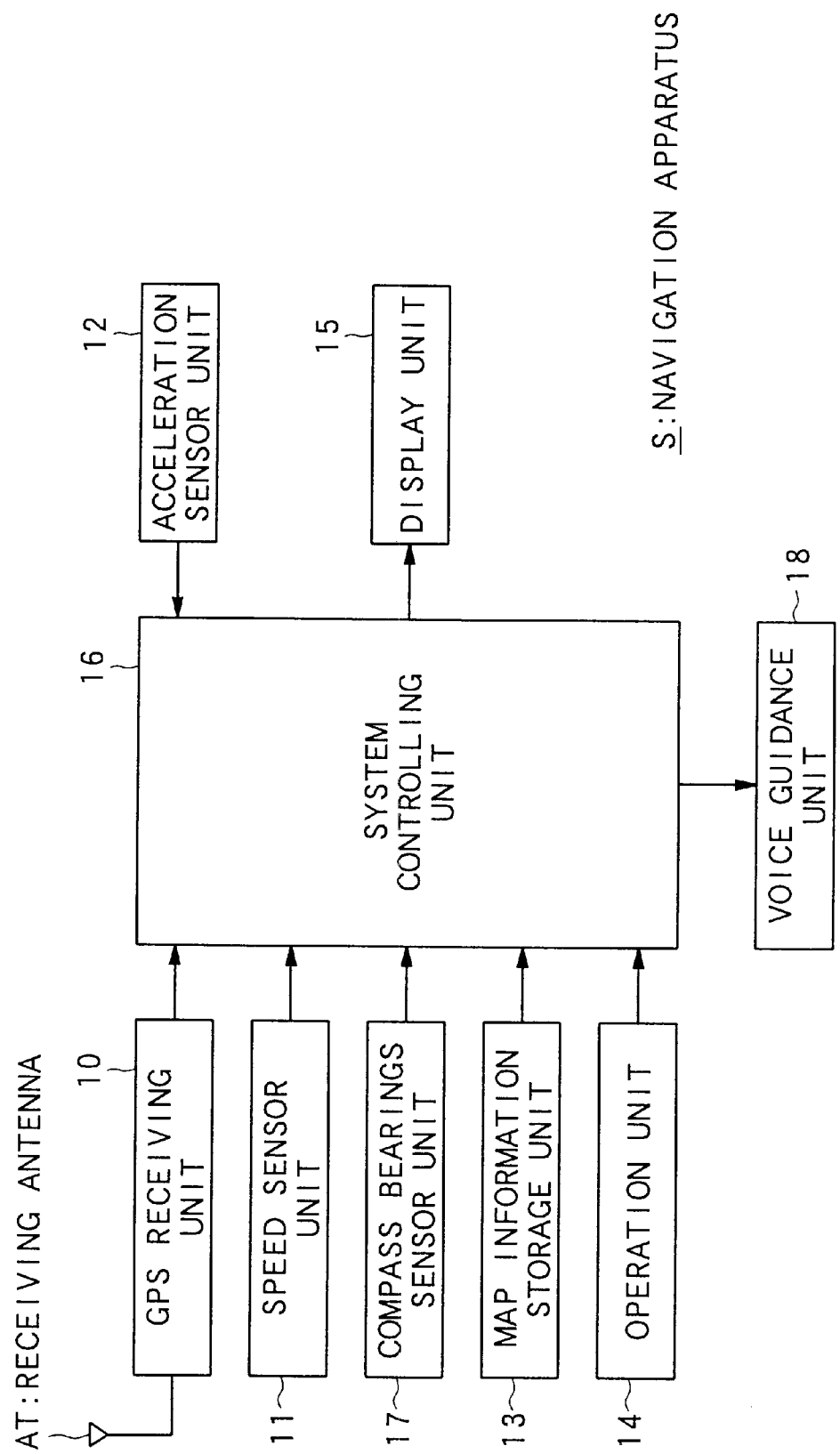
FIG. 1 is a block diagram showing the schematic configuration of a navigation apparatus according to an embodiment.

FIG. 1 is a block diagram showing the schematic configuration of a navigation apparatus according to an embodiment. FIG. 2 is a diagram showing the map information which is used for the navigating processing according to an embodiment.

As shown in FIG. 1, a navigation apparatus S according to an embodiment comprises a GPS (Global Positioning System) receiving unit 10 which is connected with a receiving antenna AT, a speed sensor unit 11, an accelerator sensor unit 12, a map information storage unit 13, an operation unit 14, a display unit 15, a system controlling unit 16 as a device for setting the predetermined route, as a device for inferring, as a device for starting to set, as a device for detecting the behavior, as a device for detecting the present position, as a device for detecting the action of the traffic indicator, as a device for judging, and as a device for deciding, a compass bearings sensor unit 17, a voice guidance unit 18.

The outline of the operation will now be described.

First, a GPS receiving unit 10 receives radio waves for navigation from a plurality of artificial satellites which belong to GPS through a receiving antenna AT, calculates the pseudo coordinates of the present position, and outputs the result as GPS data to the system controlling unit 16.

On the other hand, a speed sensor unit 11 senses the traveling speed of the vehicle, transforms the sensed traveling speed into the speed data which will take the form of pulse or voltage, and outputs it into the system controlling unit 16.

Furthermore, a compass bearings sensor unit 17 comprises so-called a gyroscope sensor. It senses the compass bearings of the vehicle, namely, the compass bearings which the vehicle continues traveling towards, transforms the sensed compass bearings into the compass bearings data which takes forms of pulse or voltage, and outputs it to the system controlling unit 16.

Moreover, by comparing (the direction of) the gravitational acceleration with (the direction of) the acceleration which generates when the vehicle travels, an accelerator sensor unit 12 senses the status of the vertical motion of the vehicle, transforms the acceleration data which shows the sensed status of traveling into the data which takes forms of pulse or voltage, and outputs it to the system controlling unit 16.

On the other hand, a map information storage unit 13 stores map information, such as road maps, which are stored in the forms described later, and the other added information which is required so as to guide to move. To be more specific, it comprises DVD drive and so forth which read out the map information and so forth from DVD-ROM (DVD-Read Only Memory) that stores the map information, and the added information, for example.

Moreover, an operation unit 14 comprises a remote control unit and so forth which contains several kinds of buttons for confirming and a lot of keys such as numerical keys, and it is the unit for inputting orders of the driver (for example, display order of vehicle traveling information).

Next, a display unit 15 displays the map information which is output from the map information storage unit 13 and several kinds of the statuses and so forth which are required in order for the navigation apparatus S to guide traveling.

Furthermore, a voice guidance unit 18 outputs the traveling route guidance information which contains the traveling direction of the vehicle at the next intersection and the information (information on traffic jams and information on closed traffic) which should be directly notified the driver for guiding to drive in a form of voice.

In parallel with these operations, a system controlling unit 16 contains several kinds of input and output ports (for example, GPS receiving port, key input port, a port for controlling a display unit 15, and so forth), it controls as a whole the general functions for the navigation processing on the embodiment a described later, controls itself so as to display the aforementioned traveling route guidance information on the map which shows the environs containing the present point of the vehicle in display unit 15 on the basis of the traveling information (the position data of the vehicle and its speed data) which is obtained from the not-illustrated position calculating unit, and controls itself so as to be output the aforementioned traveling route guidance information and so forth from voice guidance unit 18 in a form of voice.

Then, the aforementioned position calculation unit calculates a plurality of the present pseudo positions of the vehicle on the basis of the speed data of the vehicle and the compass bearings data which are output from the speed sensor unit 11 and the compass bearings sensor unit 17, compares the aforementioned pseudo coordinates which are associated with the present position output from the GPS receiving unit 10 with one of the present pseudo positions which are calculated in the above, calculates the display position of the position mark described later (the position mark which shows the present position of the vehicle on the map) which should be displayed on the display unit 15, and calculates the traveling information such as the speed of the vehicle which is not on the aforementioned present pseudo position and its traveling direction and so forth. It is not significant whether it is equipped in the inside or the outside of the system controlling unit 16.

Therefore, since the navigation apparatus S of the embodiment contains the aforementioned acceleration sensor unit 12, by the use of the acceleration data which sensed in the acceleration sensor unit 12, the aforementioned position calculation unit calculates the present pseudo positions of the aforementioned vehicle judging the inclination of the road and its vertical interval.

Herewith, even at a cubic interchange and a position that an open road and an elevated freeway looks overlapped from the top view, where it was difficult to calculate the present position of the vehicle only with the use of the several kinds of data from the aforementioned speed sensor unit 11 and the compass bearings sensor unit 17 which senses its position in two dimensions, it is possible to calculate it with accuracy. Moreover, for example, when the vehicle travels in the mountain path or on the slope, it is possible to make revisions of the tolerance between the real traveling distance which a vehicle travels and the apparent traveling distance on the map (that is to say, in the case that the aforementioned real traveling distance that is obtained when a vehicle travels on a slope is longer than the apparent traveling distance that is measured on a map, the tolerance is the difference between the former traveling distance and the later one), which appears on calculating its present position on the basis of several kinds of data from the aforementioned speed sensor unit 11 and from the compass bearings sensor unit 17 with the aid of the sensed inclination of the road.

Next, the data configuration on the road information which is stored in the map information storage unit 13 will now be described with reference to FIG. 2. FIG. 2 is a schematic diagram which illustrates a data configuration on map information stored in the map information storage unit 13.

In map information storage unit 13, the map information MP is -stored in a status that meshes Ms lie lengthwise and crosswise in a sequence. A side of the mesh M is of a predetermined length (the length which scales down the real distance on the terrain in correspondence with the reduced scale of the map).

On the other hand, a road in the map information MP is one of components of the map information MP. It is stored in a form that links Ls which is a line segment connecting between two nodes Ns lie in a row. A node N is shown as a centered dot in FIG. 2 and corresponds to a knot of a road, such as an intersection, a bending point, a diverging point, a confluence, a junction. Herein, as for the information on each node. N, the position information of the position where the node N exists (more concretely, the latitude and the longitude of its position), and the characteristic number of each Node N is added to the aforementioned each node N and is stored. Furthermore, as for the information on each link L, the characteristic number of each link L (in following explanation, link ID (Identification) is described below) and the information that shows which two modes Ns are connected by the link L are added to the aforementioned each link L and stored.

Furthermore, as for the prominent place or object and others on the map information MP, the position information for showing where it exists (its latitude and its longitude) is stored together with the mark MK which means the place or object.

Moreover, besides information aforementioned, the designation information and so forth which describes a designation of each intersection is simultaneously stored as a map information MP.

Figure 2:
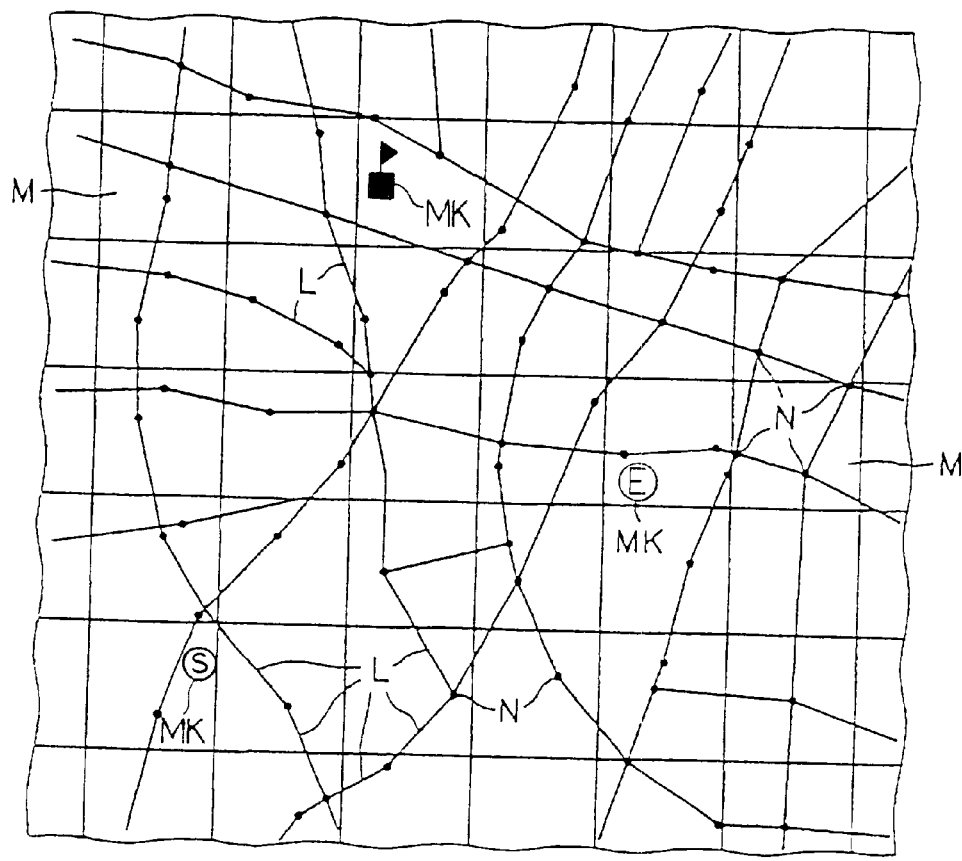
FIG. 2 is a diagram showing the configuration of data in the map information.

As for the map information MP shown in FIG. 2, there are stored a plurality of map information MP that shows the same district with different reduced scales. The aforementioned information on node N, the information on link L, the information on the prominent places or objects, the designation information and others of each map information MP with different reduced scales are stored in the map information storage unit 13 independently.

Next, the navigation processing in an embodiment which is performed in the navigation apparatus S provided with the aforementioned configuration (the navigation processing in use of the predetermined route to the predetermined destination) will be described mainly with reference to FIG. 3 and FIG. 4.

Figure 3:
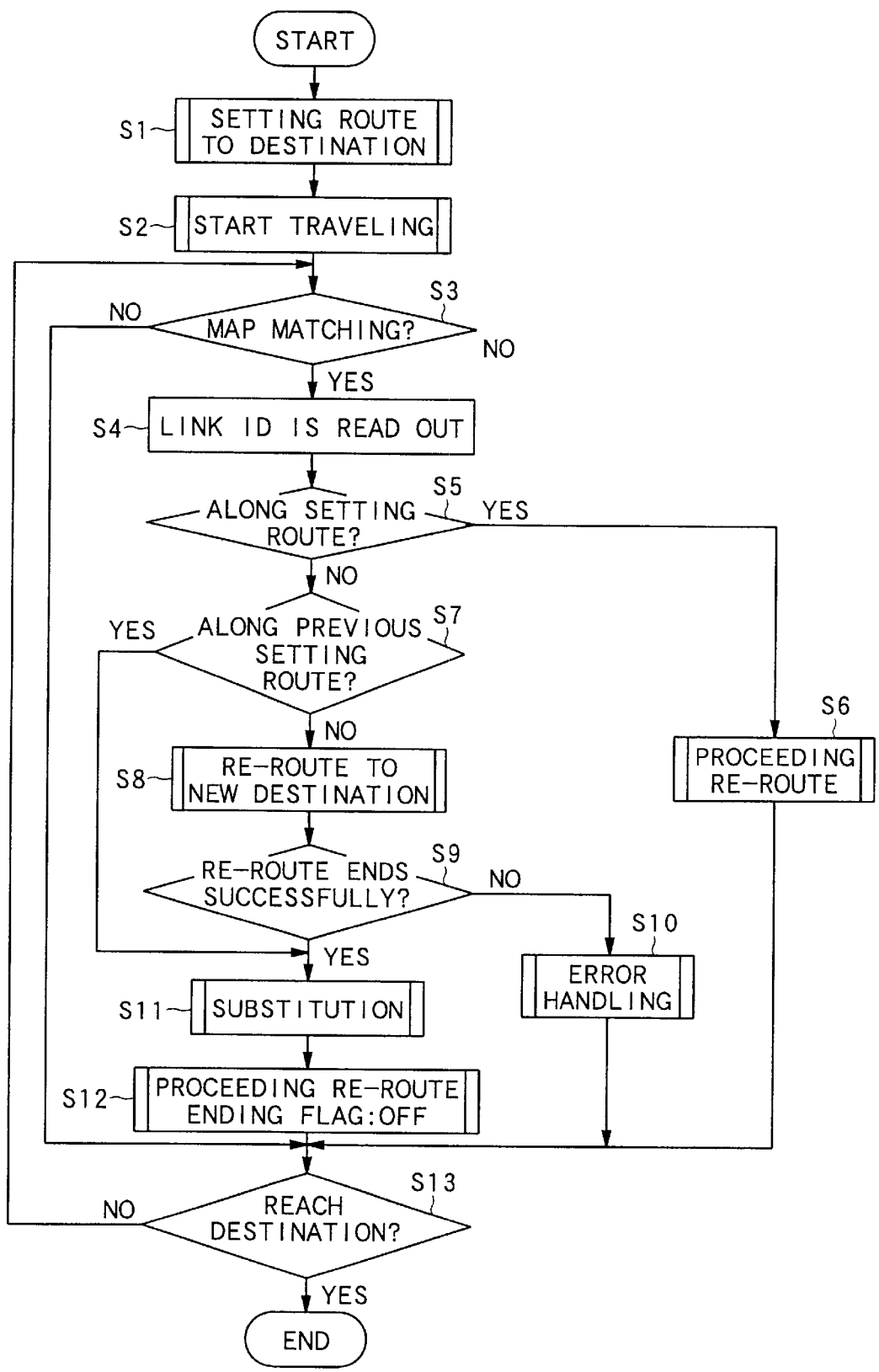
FIG. 3 is a flowchart showing a navigation processing according to the embodiment.

FIG. 3 is a flowchart showing a navigation processing. FIG. 4 is a flowchart showing an advanced re-routing processing.

Furthermore, in the later description, the re-route processing is the process in which a new other route is set as a setting route in the case that the setting route which is pre-scheduled has been set on the map.

As described in FIG. 3, in the navigation processing of the embodiment, first off, before the vehicle starts traveling, the setting route to the destination at that moment is set on the basis of the traffic information and the position of the vehicle at that time (in step S1), after that, the vehicle starts traveling (in step S2). Herein as for the information showing the setting route, there is stored a plurality of link IDs in the not-illustrated memory in the system controlling unit 16. The link IDs show a plurality of link Ls correspondent with the roads comprising the setting route. The link IDs describe in order from the starting point to the destination on the setting route.

Next, the vehicle on traveling, the matching between the present position of the vehicle and the road on the map where the vehicle should locate (so-called, map matching) is always performed (in step S3). When the matching gets delinquent (in step S3; NO), it is decided that it is not useful any longer to assist moving with the aid of the present setting route. It transits to the below-described step S13, and performs the other process, such as assistance of the vehicle's traveling with the aid of the other setting route or others.

On the other hand, on decision in step S3, map matching keeps good (in step S3; YES), next, a link ID which shows the roads where the vehicle is now traveling is read out from the aforementioned not-illustrated memory (in step S4), whether or not the vehicle is traveling along the setting route setting in step S1 is confirmed (in step S5).

When the vehicle is now traveling along the setting route (in step S5; YES), the proceeding re-route processing later described (in follows, referred to proceeding re-route processing) starts and performs before the vehicle deviates from the setting route (in step S6), and transmits to step S13 described below for further details.

On the other hand, on decision in step S5, when the vehicle is not traveling now along the setting route (that is to say, the vehicle deviates from the setting route and continues traveling) (in step S5; NO), next, it is decided whether or not there is agreement between the first link ID among the link IDs which are correspondence to the link L and the link ID of the road where the vehicle is now traveling (in step S7). Herein, the link L is contained in the setting route which was set in the re-route process (refer to the below-described step S8 or S27) that was performed at one cycle before in the flowchart shown in FIG. 3 (in follows, referred to 'previous setting route'). The link ID which shows the road where the vehicle is now traveling shows that the vehicle derivates from the setting rout. That is to say, in step S7, it is decided whether or not the vehicle continues traveling along the previous setting route. When there is agreement (in step S7; YES), the setting route which is now set (the setting route where the vehicle is decided to deviate from on decision in step S5) substitutes for the previous setting route (in step S11), the proceeding re-route ending flag in the not-illustrated memory (the flag which shows whether or not the processing in aforementioned step S6 ends) is set off (in step S12).

It is decided whether or not the vehicle reach the destination with the aid of the navigation process by means of the navigation apparatus S which contains the navigation processing by means of the aforementioned substituted previous setting route (in step S13). When the vehicle does not reach the destination (in step S13; NO), the process gets back to the aforementioned step S3, and it is performed that a series of the aforementioned processes for the previous setting route which is now in use. On the other hand, when the vehicle reaches (in step S13; YES), a whole series of navigation processes end.

On the other hand, in the decision in step S7, when there is not agreement between the first link ID among the link IDs which the aforementioned setting route contains and the link ID of the road where the vehicle is now traveling and not among the setting route (in step S7; NO), the road where the vehicle exists (continues traveling) is set as an starting point, the re-route process to the destination is newly performed in the use of link ID which corresponds with the road being the starting point (in step S8).

It is decided whether or not the re-route process ends successfully (in step S9), when it does not end successfully (in step S9; NO), the error handling process, such as an error message generating process in which shows that an error happens, is performed (in step S10), shifts to step S13.

Furthermore, in the decision in step S9, when the newly re-route process ends successfully (in step S9; YES), the setting route from which the vehicle was judged to deviate is substituted to the setting route which is newly processed in the re-route process (in step S11). After that, the aforementioned steps S12 and S13 are performed, and a series of the navigation processes end.

Next, the aforementioned proceeding re-route process in step S6 will be described with reference of FIG. 4.

Figure 4:
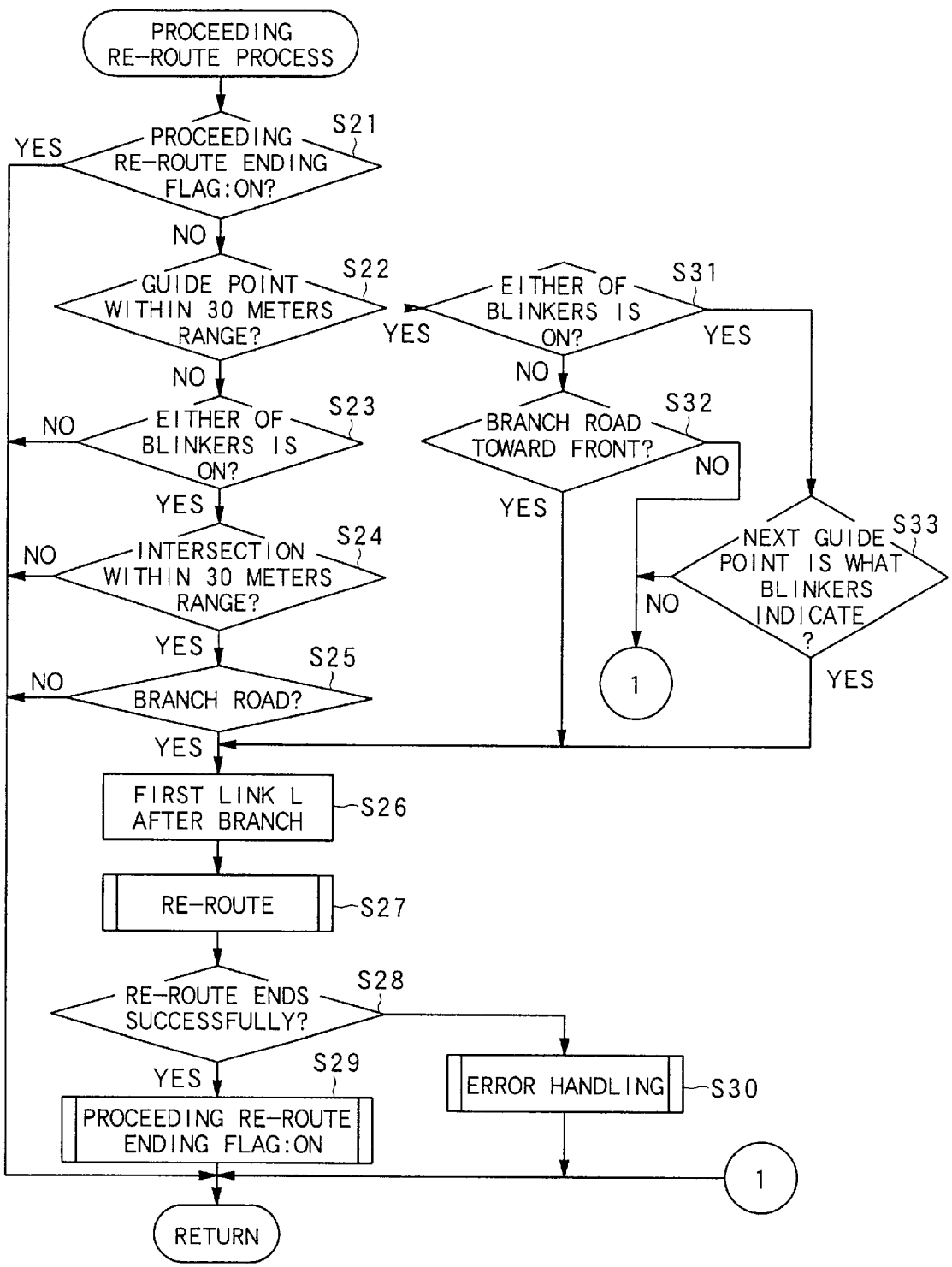
FIG. 4 is a flowchart showing an advanced re-routing processing according to an embodiment.

As shown in FIG. 4, in the proceeding re-route process, first off, whether or not the aforementioned proceeding re-route ending flag is on (that is to say, whether or not the proceeding re-route process ends in the process where was performed at one cycle before in the flowchart shown in FIG. 3) is decided (in step S21). When the proceeding re-route ending flag is on (in step S21; YES), it transits to step S13 shown in FIG. 3 with nothing done, since it is not necessary yet to perform the process in step S6. On the other hand, when the proceeding re-route ending flag is not on (in step S21; NO), next, whether or not there is a guide point within the 30 meters range in front of the present point of the vehicle on the setting route which was set in step S1 is checked (in step S22)

Herein, the guide point in step S22 is a place where a famous place or object locates which should be informed to a driver during performing the navigation process by means of graphical images or voice messages, but which does not contain any intersections.

Furthermore, the 30-meter, a distance where the presence or absence of the guide point is checked in the decision in step S22, has been obtained empirically and experimentally. Provided that the more appropriate distance is obtained as a starting timing of the proceeding re-route, this distance is not restricted to the 30 meter (the same as in the decision in step S24 described later).

In the decision in step S22, when there is not a guide point within the 30 meters range toward the front (in step S22; NO), next, whether or not either of the direction indicators of the vehicle (in followings, designate 'blinkers') is on is checked (in step S23). When no blinkers are on (in step S23; NO), on the assumption that the vehicle must continue traveling on the setting route with nothing done, it transits to the process of step S13 shown in FIG.3. On the other hand, when either of the blinkers is on (in step S23; YES), moreover, whether or not there is an intersection within the 30 meters range toward the front of the present point of the vehicle on the setting route which was set in step S1 is checked (in step S24).

When there is not an intersection within the 30 meters range toward the front (in step S24; NO), on the assumption that the vehicle must continue traveling on the setting route with nothing done, it transits to the process shown in FIG.3. On the other hand, when there is an intersection within the 30 meters range toward the front (in step S24; YES), next, whether or not there is a branch road at the intersection in the direction which the blinkers indicate is checked (in step S25).

In the decision in step S25, when there is not a branch road in the direction which the blinkers indicate (in step S25; NO), the behaviors of the blinkers which is decided to be doing in step S23 is one during halting or is done by reason of a certain errors, the vehicle must continue traveling on the setting route with nothing done. It transits to the process of step S13 shown in FIG. 3 with nothing done.

On the other hand, in the decision in step S25, when there is a branch road in the direction which the blinkers indicate (in step S25; YES), the link ID of the first link L after the branch of the road is obtained from the map information (in step S26), it sets the link L of the link ID which was obtained as a starting point, and it starts and performs the re-route process to the destination (in step S27).

Whether or not the re-route process ends successfully is decided (in step S28). When it does not end successfully (in step S28; NO), the error handling process, such as an error message generating process in which shows that an error happens, is performed (in step S30), and it shifts to the processes shown in FIG. 3.

Furthermore, in the decision in step S28, when the re-route process ends successfully (in step S28; YES), the aforementioned proceeding re-route ending flag is set on (in step S29), and shifts to the process of step S13 shown in FIG. 3.

On the other hand, in the decision in step S22, when there is a guide point within the 30 meters range toward the front of the present point of the vehicle on the setting route which was set in step S1 (in step S22; YES), next, whether or not either of the blinkers of the vehicle is on is checked (in step S31). When neither blinkers is on (in step S31; NO), next, whether or not there is a branch road toward the front of the present setting route is decided (in step S32). When there is a branch road (in step S32; YES), the link ID of the first link L after the branch of the road is obtained from the map information (in step S26), it sets the link L of the link ID which was obtained as a starting point, and it starts and performs the re-route process to the destination (in step S27), and after that it performs the aforementioned steps S28 to S30.

On the other hand, in the decision in step S32, when there are no branch roads toward the front of the present setting route (in step S32; NO), it shifts to the process of step S13 shown in FIG. 3 with nothing done.

Next, in the decision in step S31, when either of right-side one or left-side of blinkers is in action (in step S31; YES), it is decided whether or not the nearest guide point is the same as the guide point that the on-acting blinkers actually indicate (in step S33).

When this is the very guide point which the blinkers actually indicate (in step S33; YES), the link ID of the first link L after the road branch is obtained from the map information MP (in step S26), it sets the link L of the link ID which was obtained as a starting point, and it starts and performs the re-route process to the destination (in step S27), and after that it performs the aforementioned steps S28 to S30.

On the other hand, in the decision in step S33, when it is not the guide point which the blinkers actually indicate (in step S33; NO), it shifts to the process of step S13 shown in FIG. 3 with nothing done.

As described above, in navigation process of the navigation apparatus S according to the present embodiment, when it is inferred that a vehicle deviates from the setting route and continues traveling, the action of setting the other setting route starts before it deviates from the route actually. So after the vehicle deviates from the setting route as it is inferred, it is possible to start assisting the navigation process of the vehicle by means of the setting route thereafter without delay.

Furthermore, since the navigation apparatus S checks whether the blinkers begin to act, and since it infers traveling of the vehicle, it is possible to infer the direction of traveling of the vehicle with reliability.

Moreover, it is detected which side of the blinkers is in action, and it is judged that the vehicle makes a turn towards the direction which the blinkers on duty indicates on the basis of the action of the blinkers which is detected. It is possible to infer which direction the vehicle makes a left-hand turn or right-hand turn with more accuracy.

In the aforementioned embodiment, the direction of traveling of the vehicle is inferred on the basis of the behaviors of the blinkers. Except this, it is judged which traffic lane of the road where the vehicle is traveling on the basis of its detected present position. The present speed of the vehicle is monitored. For example, when it is judged that the vehicle is traveling on the right-end (or left-end) lane of the road and that the vehicle reduces its speed before the intersection, the system can infer the action of making a right-hand turn (or a left-hand turn) at the intersection and can start setting a new setting route after the right turn (or left turn).

In this case, before the blinkers are in action, it is possible to detect the inferred direction of traveling of the vehicle and to start setting the other setting route.

Moreover, the programs which correspond to the flow-chart shown in FIG. 3 and FIG. 4 are stored into flexible disks or hard disks, and a general-purpose micro computer and so forth on board of a vehicle reads them out and performs. Then it is possible for the general-purpose micro computer to function as a system controlling unit 16 in the embodiment.

Furthermore, in the aforementioned embodiment, besides the detection of the present position and the speed and so forth of a vehicle and the detection of the action of its blinkers, the case which setting a setting route is performed in the navigation apparatus S on board of a vehicle is described. In addition, in a vehicle, the detection of its present position and its speed and so forth and the detection of the action of the blinkers are just performed, and the results are transmitted to a navigation center (a navigation center which sits in a fixed facility) which is able to communicate with the vehicle. In the navigation center, the re-route process shown in FIG. 3 and FIG. 4 can be performed, and the results can be again transmitted back to the vehicle so as to be used in the navigation processing. It is another embodiment.

Otherwise, it is possible to detect the steering angle of the wheels in spite of the action of the blinkers, and to infer the traveling direction of the vehicle in consideration of the aforementioned angle and information on the traffic lane which the vehicle is now traveling on. It is further embodiment.

In this embodiment, as for the information of the traffic lane which the vehicle is now traveling on, the traffic lane can be decided on the basis of the position information which is obtained from so-called VICS (Vehicle Information Communication System), now under building up, in addition to the information which the navigation system detects autonomously.

In the aforementioned embodiment, the present invention is described in the case of applying to a navigation apparatus for vehicles. But the present invention can be applied not only to a navigation apparatus for vehicles but also a cellular phone or a cellular terminal which can work as a navigation apparatus. That is to say, the present invention can be applied to a vehicle navigation system which has a present position detecting device for detecting its position, and to a navigation system for the aforementioned cellular phone or the aforementioned cellular terminal. In addition, the present invention can be applied to a navigation system that the base station detects the present position of the navigation apparatus, and that the aforementioned navigation apparatus receives the results from the base station.

The entire disclosure of Japanese Patent Application No. 2000-379907 filed on Dec. 14, 2000 including the specification, claims, drawings and summary is incorporated herein by reference in its entirety.

What is claimed is:

1. A navigation apparatus comprising:

a predetermined route setting device for setting a predetermined route which a mobile unit travels;

an inferring device for inferring whether or not the mobile unit deviates from the predetermined route during traveling of the mobile unit along the predetermined route;

a setting start device for, when it is inferred that the mobile unit deviates from the predetermined route, starting to set the inferred predetermined route where the mobile unit travels after deviating from the predetermined route;

a determining device for determining whether or not the mobile unit is on the inferred predetermined route; and an adoption device for adopting the inferred predetermined route as a new predetermined route, when the determining device determines the mobile unit is on the inferred predetermined route.

2. The navigation apparatus according to claim 1, wherein the inferring device comprises:

a behaviors detecting device for detecting behaviors which the mobile unit is inferred to do during traveling;

a present position detecting device for detecting the present position of the mobile unit; and a decision device for, on the basis of the detected behaviors and the detected present position, deciding whether or not the mobile unit deviates from the predeterminating route.

3. The navigation apparatus according to claim 2, wherein the mobile unit is a vehicle; and the behaviors detecting device comprises:

a direction indicators' action detecting device for detecting which side of the direction indicators is in action; and when the action of the direction indicators is confirmed, the behaviors detecting device starts detecting behaviors of the mobile unit.

4. The navigation apparatus according to claim 2, wherein the mobile unit is a vehicle; and the behaviors detecting device comprises:

a direction indicators' action detecting device for detecting which side of the direction indicators is in action; and a judging device for, on the basis of the detected behaviors of the direction indicators, judging that the mobile unit turns to the direction which the in-action direction indicators indicate.

5. The navigation apparatus according to claim 2, wherein the mobile unit is a vehicle;

the present position detecting device detects which traffic lane of the road the mobile unit is traveling on; and when it is detected that the mobile unit is traveling on the outer lane on the road and that it is slowing down in the position where the mobile unit must travel straight in the predetermined route, the decision device infers that the mobile unit deviates from the predetermined route, and that the mobile unit turns to the direction of the traffic lane where the mobile unit is traveling from the view of the center line of the road.

6. A navigation method comprising:

a predetermined route setting process for setting a predetermined route which a mobile unit travels;

an inferring process for inferring whether or not the mobile unit deviates from the predetermined route during traveling of the mobile unit along the predetermined route;

a setting start process for, when it is inferred that the mobile unit deviates from the predetermined route, starting to set the inferred predetermined route where the mobile unit travels after deviating from the predetermined route;

a determining process for determining whether or not the mobile unit is on the inferred predetermined route; and an adoption process for adopting the inferred predetermined route as a new predetermined route, when, in the determining process, it is determined that the mobile unit is on the inferred predetermined route.

7. The navigation method according to claim 6, wherein the inferring process comprises:

a behaviors detecting process for detecting behaviors which the mobile unit is inferred to do during traveling;

a present position detecting process for detecting the present position of the mobile unit; and a decision process for, on the basis of the detected behaviors and the detected present position, deciding whether or not the mobile unit deviates from it the predeterminating route.

8. An information recording medium in which a navigating program is recorded so as to be readable through a computer which functions as a navigation apparatus, the navigating program being characterized by allowing the computer to function as:

a predetermined route setting device for setting a predetermined route which a mobile unit travels;

an inferring device for inferring whether or not the mobile unit deviates from the predetermined route during traveling of the mobile unit along the predetermined route;

a setting start device for, when it is inferred that the mobile unit deviates from the predetermined route, starting to set the inferred predetermined route where the mobile unit travels after deviating from the predetermined route;

a determining device for determining whether or not the mobile unit being on the inferred predetermined route; and an adoption device for adopting the inferred predetermined route as a new predetermined route, when the determining device determines the mobile unit being on the inferred predetermined route.

9. The information recording medium according to claim 8, wherein the navigating program is recorded so as to be readable through the computer which functions as the inferring device, the navigating program being characterized by allowing the computer to function as:

a behaviors detecting device for detecting behaviors which the mobile unit is inferred to do during traveling;

a present position detecting device for detecting the present position of the mobile unit; and a decision device for, on the basis of the detected behaviors and the detected present position, deciding whether or not the mobile unit deviates from the predeterminating route.

10. The navigation apparatus according to claim 1, wherein the predetermined route setting device sets a new route, when the determining device determines the mobile unit is not on the inferred predetermined route.

11. The navigation apparatus according to claim 1, wherein the inferring device infers the future action of the mobile unit during traveling of the mobile unit along the predetermined route.

12. The navigation apparatus according to claim 2, wherein the mobile unit is a vehicle; and the behaviors detecting device comprises a steering angle detecting device for detecting the steering angle of the wheels; and when it is detected that the change of the steering angle of the wheels, the behaviors detecting device starts detecting behaviors of the mobile unit.

* * * * *